United States Patent [19]

Stansbury

[11] 3,852,015

[45] Dec. 3, 1974

[54] BELLING AND HANDLING APPARATUS FOR PLASTIC PIPE

[75] Inventor: Patrick H. Stansbury, Spokane, Wash.

[73] Assignee: ASC Industries, Inc., Spokane, Wash.

[22] Filed: Mar. 12, 1973

[21] Appl. No.: 340,478

[52] U.S. Cl. .............................. 425/392, 425/455
[51] Int. Cl. ........................................... B29c 17/02
[58] Field of Search ......... 425/393, 392, 455; 72/85

[56] References Cited
UNITED STATES PATENTS

| 3,205,535 | 9/1965 | Niessner et al. ............... 425/393 X |
| 3,672,804 | 6/1972 | Dalik ............................ 425/393 X |

*Primary Examiner*—Robert L. Spicer, Jr.
*Attorney, Agent, or Firm*—Wells, St. John & Roberts

[57] ABSTRACT

A bell forming apparatus for automatically forming a bell shape in extruded plastic pipe. The apparatus receives cut lengths of pipe in a first trough section as they travel directly from the extruder. The first trough releases successive lengths of pipe to roll gravitationally in a transverse direction to a collecting station. The pipes are individually moved from the collecting station to roll down a transverse inclined track and into a second trough. This trough aligns one end of the pipe with the opening of an oven at a heating station. A cylinder positions the pipe longitudinally relative to the oven and another cylinder is activated to move the oven over a selected length of the pipe. After a prescribed time interval, the oven is retracted and the pipe is transferred to a third trough. This trough aligns the pipe with a clamp and mandrel unit. A cylinder positions the pipe longitudinally in the clamp, the clamp jaws are tightened and the mandrel is forced into the heated end of the pipe. After a time interval, the mandrel is extracted, leaving an enlarged bell shape in the end of the pipe. The finished belled pipe is then released to roll gravitationally to a storage station for further processing.

8 Claims, 7 Drawing Figures

BELLING AND HANDLING APPARATUS FOR PLASTIC PIPE

BACKGROUND OF THE INVENTION

Plastic pipe and tubing is manufactured in continuous cylindrical form by extruding machines. These machines extrude the pipe along a horizontal axis adjacent an automatic cut-off saw that cuts the pipe to a predetermined length. From this point the pipes may be regarded as finished or may continue on to a further process in which the ends of the pipes are formed into various shapes that facilitate joining of the lengths of pipes at a later time. It is in this process that some difficulty has been experienced. The primary difficulty arises at the stage where the ends of the pipes are heated until the plastic becomes soft and ductile. The apparatus utilized for this purpose is usually a vat of heated glycerine. In order to submerge the ends of the pipes in the glycerine, they must first be tipped and suspended in an upright orientation. Not only is this a rather time consuming task, but also requires a substantial amount of vertical clearance above the vats.

Once heated, the pipes are moved to a forming station where a mandrel of the desired inside shape of the pipe ends is inserted into the pipes. The plastic then cools in the shape of the mandrel.

This problem has been realized in a limited degree in the U.S. Pat. Nos. 3,672,804 and 3,689,190, granted to Herbert A. Dalik and Roman Brietfuss respectively.

The Dalik patent discloses a pipe belling machine wherein precut lengths of pipe are received and moved vertically by an upright chain conveyor past successive operational stations wherein opposite ends of adjacent pipes are cleaned, scribed, heated and belled. The operations of heating and forming a bell shape in the pipes are accomplished by first clamping the pipe tightly adjacent the end to be operated upon. The clamps then move the pipe longitudinally into the bore of an oil heated oven. After the pipe end is heated sufficiently, the clamp moves the pipe back to its original longitudinal position on the conveyor. The same procedure is then repeated for the bell forming operation. Obviously the conveyor apparatus and clamp assemblies of this device are of a substantially complex nature.

The Breitfuss patent discloses an apparatus for forming a tube socket in thermoplastic pipes. This apparatus is designed specifically for receiving pipe moving from an extruding machine and forming a bell socket in one end thereof. The oven of this device is longitudinally movable to receive the successive ends of pipes as they move from the extruder cut-off machine. The oven moves along with the pipe until the other end is cut off to form a cut length of pipe. By the time the pipe is cut to length, the free end has reached a sufficient temperature to permit insertion of a mandrel for bell forming operations. The controls involved in precisely heating such pipe over a time period determined by the speed of operation of the extruder would necessarily be extremely complex.

The apparatus of the present disclosure comprises means for receiving, heating and forming plastic pipe with the pipe remaining in a horizontal orientation. The apparatus is designed to receive cut lengths of pipe directly from the extruder or other appropriate source. The pipes are individually moved by force of gravity along inclined tracks from a storage station to a heating station. A hot air oven utilizing radiant and convectional heat is moved over one end of each pipe at the heating station to quickly heat the plastic to a soft ductile condition while the pipe remains horizontal. Once heated, the pipe is again allowed to move down an incline to an end forming station where a clamp grips the heated ends and a mandrel is inserted to produce the desired shape. The finished pipe is then allowed to continue down the incline to a storage station where they may be removed for shipping or further processing.

SUMMARY OF THE INVENTION

The disclosed belling and handling apparatus for plastic pipe essentially comprises a pair of supports in the form of upwardly open troughs, along which individual lengths of pipe are positioned by delivery and transfer mechanisms. Each length of pipe is longitudinally located at a precise location on each trough. At corresponding ends of the two troughs are a heating oven and a forming mandrel. At the opposite ends are pushing plates which enclose the abutted end of a pipe and assure its proper longitudinal position on the respective trough. Both the oven and mandrel are movable relative to the stationary length of pipe on the respective trough, whereby pipe lengths are simultaneously heated and formed in a continuing operation.

It is a first object of this invention to provide an apparatus for heating and belling plastic pipe wherein the pipe is held stationary during the operations carried out upon it.

Another object of this invention is to provide a relatively compact conveying arrangement between supporting troughs for heating and forming the ends of plastic pipe.

Another object of this invention is to utilize gravitational conveying of pipe between work stations for belling the ends of the pipe.

These and further objects will be evident from the following detailed disclosure, taken together with the accompanying claims.

DESCRIPTION OF A PREFERRED EMBODIMENT

Figure 1:
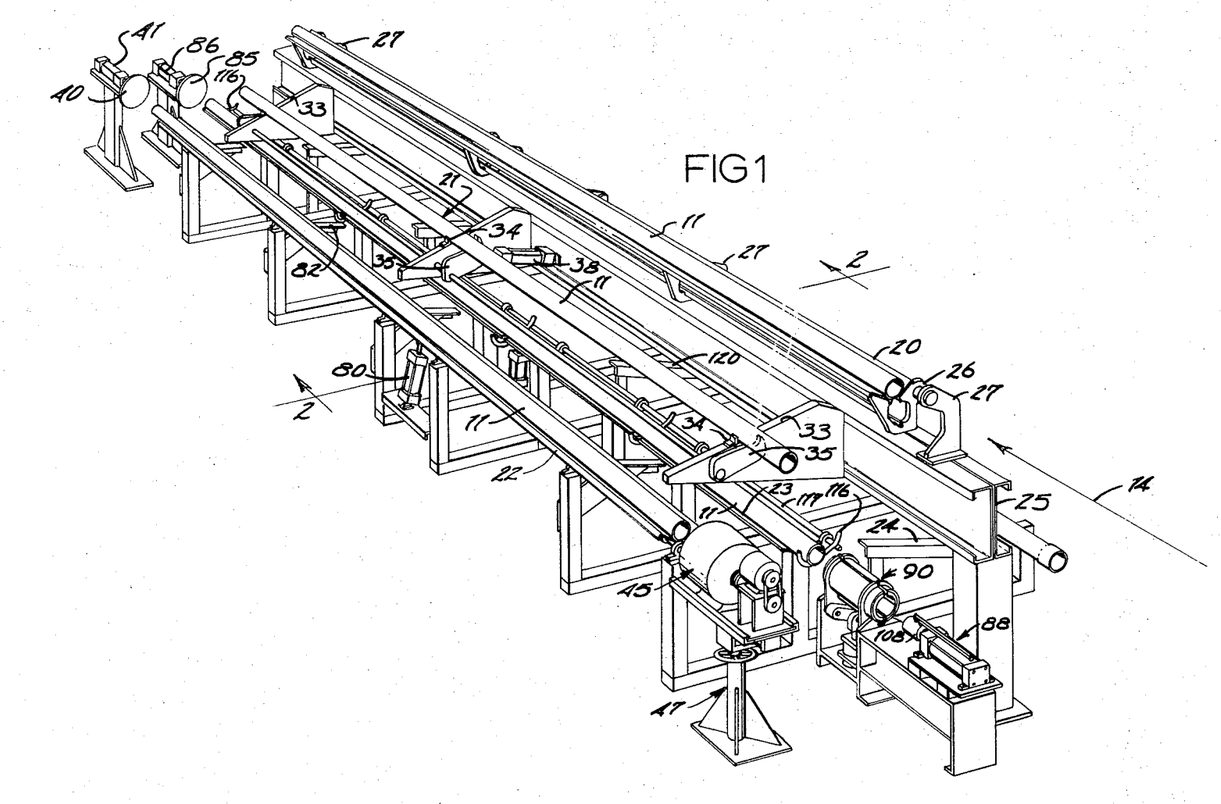
FIG. 1 is a perspective view of the apparatus.

The apparatus as illustrated in FIG. 1 is supported by a framework, shown generally by the reference numeral 10.

A device comprising a preferred form of this invention is illustrated in FIG. 1 adjacent a longitudinal infeed of elongated plastic pipe. An arrow, designated by a reference numeral 14, represents a preferred direction of infeed. The source of infeed is not illustrated in the drawings, principally for the reason that the present apparatus may be utilized with nearly any infeed means that serves to effectively deliver plastic pipe to an elongated receiving trough 20. For example, the apparatus could be positioned adjacent the outfeed end of a cut-off saw for an extruding machine. When utilized in such a position, the cut lengths of pipe would be fed end to end toward the receiving trough 20, with their longitudinal axes coaxial with one another and parallel to the indicated direction of travel.

The apparatus is designed to receive and automatically handle individual plastic pipes through a belling operation wherein one end of the pipe is heated until it becomes ductile. A mandrel is then inserted into the heated pipe end to form the heated plastic to a shape complementary to the periphery of the mandrel.

The belling operation involves a series of work stations which may be described in general with reference to FIG. 1. Individual cut lengths of pipe 11 are first received within longitudinal trough 20. Trough 20 is pivotable about a longitudinal axis and is selectively operated to tilt to one side dropping the pipe onto the transverse inclined tracks 33 of a collection station 21. A lifter arm mechanism is selectively operable to lift the pipe over an abutment at the collection station and allow it to roll downwardly to a second trough 22 of a heating station. One end of the pipe is heated within an oven 45 at the heating station until the plastic becomes ductile. Trough 22 is also pivotable and is pivoted once the pipe is heated, releasing the pipe to roll down another incline to a third trough 23 of a belling station. At this point, the heated end of the pipe is gripped firmly and a mandrel 108 is inserted, reshaping the pipe to the configuration of the mandrel. Once the mandrel 108 is retracted, leaving the desired bell form in the pipe end, a fork mechanism is operated to move lifter arms 116, which lift the pipe from trough 23 and allow it to roll onto a storage rack as a finished, belled pipe.

Reference may now be made in greater detail to specific elements of the apparatus with respect to the above generally described operation.

The apparatus is supported by an elongated framework 25. As shown in FIG. 1, the first trough 20 is supported on upright hanger brackets 27 longitudinally spaced along frame 25. Brackets 27 rotatably carry a pivot shaft 26 that extends along trough 20 parallel to the longitudinal axes of the incoming pipes 11. Trough 20 is rigidly mounted to shaft 26 for pivotal movement therewith.

Figure 2:
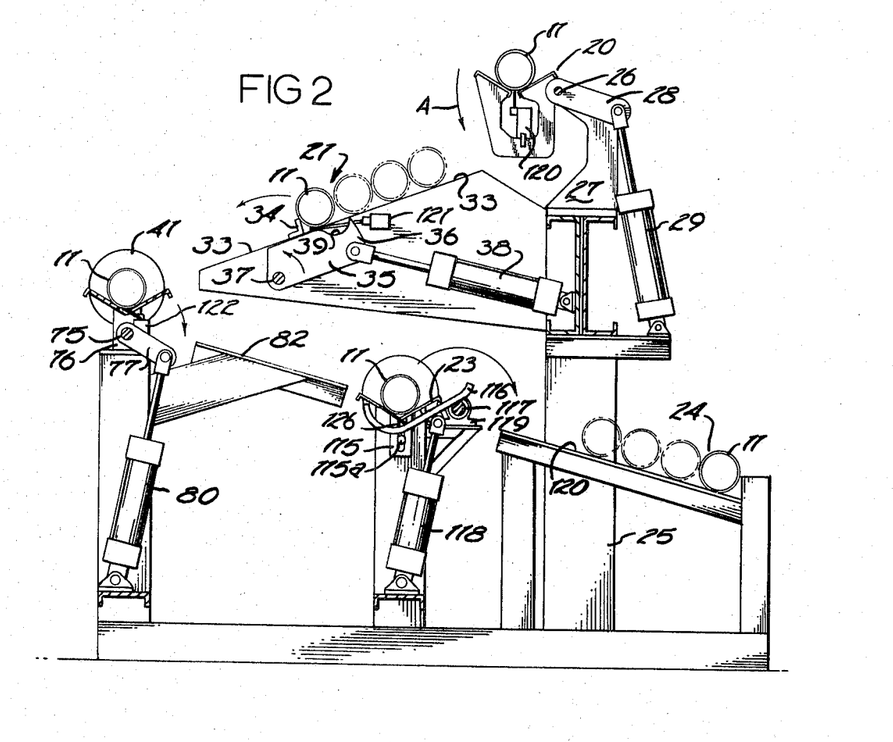
FIG. 2 is an elevational sectioned view taken along line 2—2 in FIG. 1.

Means for selectively pivoting trough 20 may best be seen in FIG. 2 as comprising a crank arm 28 and a hydraulic cylinder 29. Crank arm 28 is rigidly fixed to pivot shaft 26 and extends radially outward therefrom to pivotally mount the piston end of cylinder 29. Cylinder 29 is, in turn, mounted to a horizontal portion of frame 25. As cylinder 29 is extended, the trough 20 is tipped or pivoted in the direction indicated by arrow A in FIG. 2. This action allows a pipe presently within the trough 20 to roll laterally in a direction perpendicular to its original path of travel, onto an inclined set of transverse tracks 33.

Tracks 33 comprise an integral part of collecting station 21 referred to above. Also included is a plurality of abutments 34 positioned on tracks 33 in the path of a pipe 11 as it rolls downwardly. Abutments 34 stop downward movement of pipe 11 and provide for buildup of additional pipes behind pipe 11 (shown in phantom lines) at the collecting station 21. By providing such as a buildup space, a constant speed of the belling operation may be maintained throughout the remaining operations regardless of the pipe infeed speed.

The pipes 11 are each selectively moved over the abutments 34 by operation of pipe lifting means which is also best illustrated in FIG. 2. The lifting means includes an elongated pivot shaft 37 rotatably supported by the understructure of tracks 33. The pivotal axis on shaft 37 is parallel to the longitudinal axis of pipe 10. A plurality of lifter arms 35 (FIGS. 1 and 2) are affixed to shaft 37 for pivotal movement therewith as initiated by a hydraulic cylinder 38 connected between one arm 35 and frame 25. In their retracted positions (FIG. 2) the arms 35 extend inwardly toward trough 20 so that lifting surfaces 39 of arms 35 are positioned below the pipe 11 resting against abutments 34. As cylinder 38 is extended, the arms pivot upwardly with shaft 37, to engage and lift pipe 11 over abutments 34. Each lift arm 35 also includes a stop surface 36 which is centered about the axis of shaft 37. As the arms move upwardly, the stop surfaces engage the next succeeding pipe on tracks 33. Surfaces 36 thereby prevent the succeeding pipes from rolling under the arms 35 as pipe 11 is lifted over abutments 34.

Once clear of abutments 34, pipe 11 is free to continue rolling down tracks 33 and into the second trough 22. Trough 22 is laterally spaced from and parallel to the first trough 20. Trough 22 is utilized to hold pipe 11 elevationally stationary adjacent the heating station generally described above.

Figure 3:
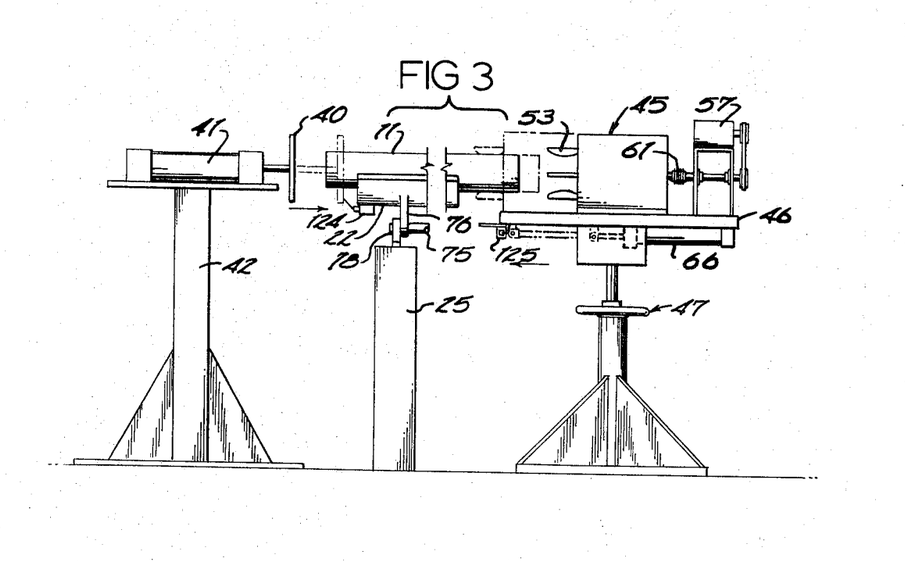
FIG. 3 is a fragmentary side elevation illustrating one phase in the operation of the apparatus.
Figure 4:
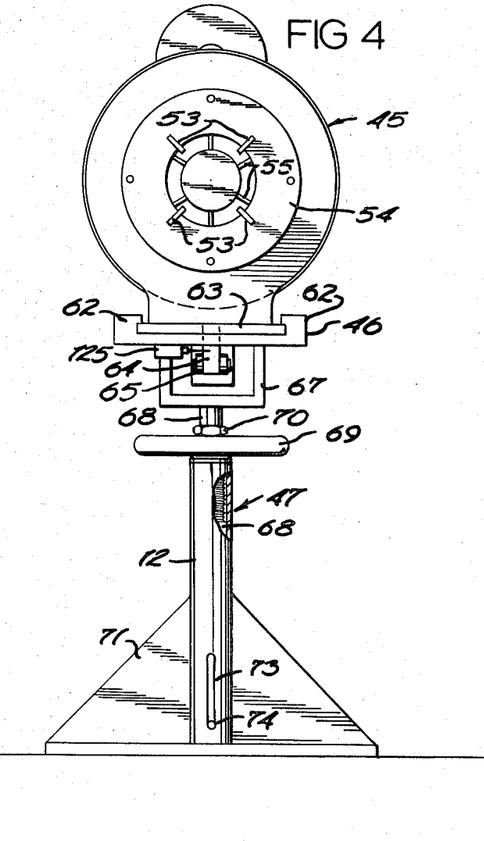
FIG. 4 is a fragmentary side elevation illustrating another phase in the operation of the invention.
Figure 5:
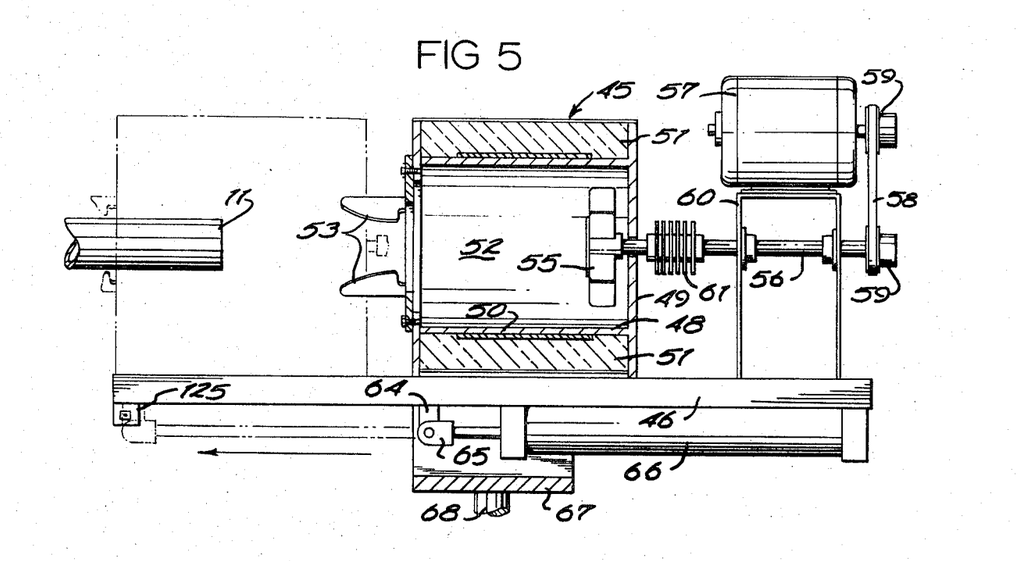
FIG. 5 is a sectioned view taken along line 5—5 in FIG. 4.

The elements and operations involved in means for heating one end of pipe 11 are specifically illustrated in FIGS. 3, 4 and 5. Looking now at FIG. 3, a hydraulic positioning cylinder 41 is shown mounted on an upright frame 42 in a horizontal orientation adjacent one end of the pipe 11. A disc 40 is affixed to the end of the piston shaft of cylinder 41. Extension of cylinder 41 brings disc 40 into abutment with the end of pipe 11. As the cylinder continues to extend, the pipe is pushed longitudinally along trough 22 until the rear end reaches a predetermined longitudinal position. This position is illustrated by dashed lines in FIG. 3. Disc 40 is held in abutment with the front end of pipe 11 until heating of its opposite end is completed. This is an important feature in that the disc seals the one end of pipe 11, preventing heated air from being drawn through the pipe from the opposite end and reducing the efficiency of the heating means.

The heating means basically comprises an oven 45, mounted coaxially with the pipe 11 in trough 22. Oven 45 is longitudinally movable on a table 46 supported on an elevationally adjustable support 47. The oven comprises a cylindrical body 48 defining a horizontal chamber 52, (FIG. 5) for selectively receiving the end of pipe 11. An electrical resistance heating element 50 is formed about the periphery of the chamber 52. Heat is conducted through the cylinder walls to radiantly heat the partially enclosed chamber 52. A band of insulation 51 is provided to prevent heat from escaping outwardly from the cylinder 48.

The rear end of cylinder 48 is enclosed by a vertical wall section 49 which also rotatably mounts the drive shaft 56 of an agitating fan 55. Shaft 56 extends coaxially with pipe 11 into the chamber 52 to mount the multiple blade fan 55. It should be noted that the individual fan blades are arranged with their side surfaces radially aligned with the rotational axis of the shaft 56. With such a blade arrangement, the heated air within chamber 52 may be agitated without drawing cool air into the chamber 52 or driving heated air out.

Fan 55 is utilized to evenly and continuously move heated air throughout chamber 52, thereby heating the interior of oven 45 by convection as well as by radiant heat. Thus heat may be applied evenly to both the outside and the inside surfaces of pipe 11. This is an important feature of the invention in that by utilizing such an oven, the pipe end is heated both quickly and evenly.

Fan 55 is powered by a motor 57 mounted on an upright pedestal 60. A belt 58 operatively connects motor 57 with shaft 56 through conventional pulleys 59. The shaft extends forwardly through journal bearings in pedestal 60 to fan 55. A multiple ribbed "heat sink" or dissipater 61 is affixed to shaft 56 between the oven and pedestal 60 to prevent heat in the shaft from reaching the journal bearings.

Oven 45 and the agitator fan assemblies are mounted together on a slidable plate 63 of table 46. Plate 63 is freely movable parallel to the longitudinal horizontal axis of pipe 11 and is guided by side engaging ways 62. Plate 63 provides a depending bracket 64 which extends through an elongated slot (not shown) in table 46. The bracket 64 is connected to the clevis 65 of a cylinder assembly 66. Cylinder assembly is mounted to table 46 with the longitudinal axis of its piston shaft parallel to the axis of pipe 11. Extension and retraction of cylinder assembly 66 thereby moves the oven and fan assembly between the extended and retracted positions shown in FIG. 5 by phantom and solid lines respectively.

The position of a pipe 11 relative to the oven 45 is shown in FIG. 5. The longitudinal position of the pipe is governed by operation of the cylinder 41 and disc 40 shortly before cylinder 66 is activated to extend. It may thus be seen that extension of cylinder 66 moves the oven 45 along the axis of pipe 11 to a position where a pre-selected portion of the end of the pipe is received within the chamber 52.

To assure that the pipe end is accurately positioned within chamber 52, a plurality of forwardly extending fingers 53 are provided to engage and position the longitudinal axis of pipe 11 coaxial with that of the oven chamber. It is important that the enclosed end of pipe 11 not touch any surface within the oven and that the pipe end be centered in the chamber, otherwise undesirable deformation of the pipe end is likely to occur during heating. Fingers 53 are mounted to annular plate 54 which is releasably attached to the front open end of the oven by bolts. The radial distance between the pipe engaging surfaces of the fingers 53 is substantially equal to the outside diameter of pipe 11. Further, the fingers 53 are spaced equadistantly from the longitudinal axis of the oven chamber 52. Thus, as the oven 45 is moved toward pipe 11, the fingers 53 first engage and center the pipe end with respect to the oven chamber axis before it enters the chamber and then hold the pipe in that coaxial position until the oven 45 is retracted and the fingers move out of engagement with the pipe.

The annular ring 54 on which fingers 53 are affixed is removable from oven 45 to facilitate its replacement with other rings having differently spaced fingers to accommodate pipes of different diameter.

Table 46 is mounted on a vertically adjustable support comprising a U-shaped yoke 67 having a depending threaded shaft 68 held by a vertical support base 71. Yoke 67 is fixed to table 46 to allow operative clearance for cylinder 66. Shaft 68 is rigidly fixed, at its upper end, to yoke 67 and it extends downwardly to threadably engage an elevation adjusting wheel 69. A vertical tubular section or shaft guide 72 of base 71 rotatably supports wheel 69. By manually turning wheel 69, the oven assembly may be raised or lowered to facilitate adjustment of the axis along chamber 52 to accommodate pipes of different diameter. A lock nut 70 is provided on shaft 68 which may be selectively tightened against wheel 69 to lock the oven assembly against further elevational movement once it has been adjusted to a selected height.

Rotation of the oven assembly about the vertical axis of shaft 68 is prevented by a slide pin 74 extending through a slot 73 in shaft guide 72. Pin 74 is fixed to the lower end of shaft 68 and extends outwardly therefrom to be slidably received in the vertically oriented slot 73. The length of slot 73 defines the limits of vertical movement of the oven assembly.

The operative sequence involved in heating the end of pipe 11 may be easily understood with reference to FIG. 3. After pipe 11 is received by trough 22, the cylinder 41 is activated to extend, bringing disc 40 into contact with the front end of the pipe, and pushing it longitudinally along the trough to a preselected position. The disc 40 is then held against the open end as cylinder 66 is activated to extend, moving oven 45 over the opposite end of the pipe. After a timed delay sufficient for heating of the pipe walls, cylinder 66 is retracted bringing the oven back to the inoperative position. Cylinder 41 is then also retracted, moving disc 40 from engagement with the front end of pipe 11. At this point, the pipe 11 is ready to be moved on to the bell forming station. This movement is accomplished by a cylinder operated trough pivot assembly which may best be seen in FIG. 2.

As shown in FIG. 2, trough 22 is pivotable about the longitudinal axis of an elongated pivot shaft 75. Trough 22 is rigidly connected to shaft 75 by depending brackets 76. Shaft 75, in turn, is rotatably supported by journal bearings 78 on frame 10. A crank arm 77 is fixed to shaft 75 and extends outwardly therefrom transverse to the shaft axis. The outer end of crank arm 77 pivotably mounts the clevis end of a cylinder 80. Cylinder 80 is pivotably connected between frame 10 and crank arm 77 so that its retraction will pivot shaft 75 and thereby trough 22 in a clockwise direction as shown in FIG. 2 to allow pipe 11 to roll from the trough onto a second set of inclined tracks 82.

Tracks 82 are positioned elevationally below and are inclined oppositely to tracks 33 to guide the pipes downwardly in a transverse direction of travel opposite to their movement on tracks 33. By reversing the movement of the pipes as such, the floor space required by the apparatus is held at a minimum.

Tracks 82 guide successive pipes from trough 22 to the third trough 23 which is located elevationally below the collection station 21. Trough 23 is utilized to position pipe 11 at the bell forming station as best seen in FIGS. 6 and 7.

Figure 6:
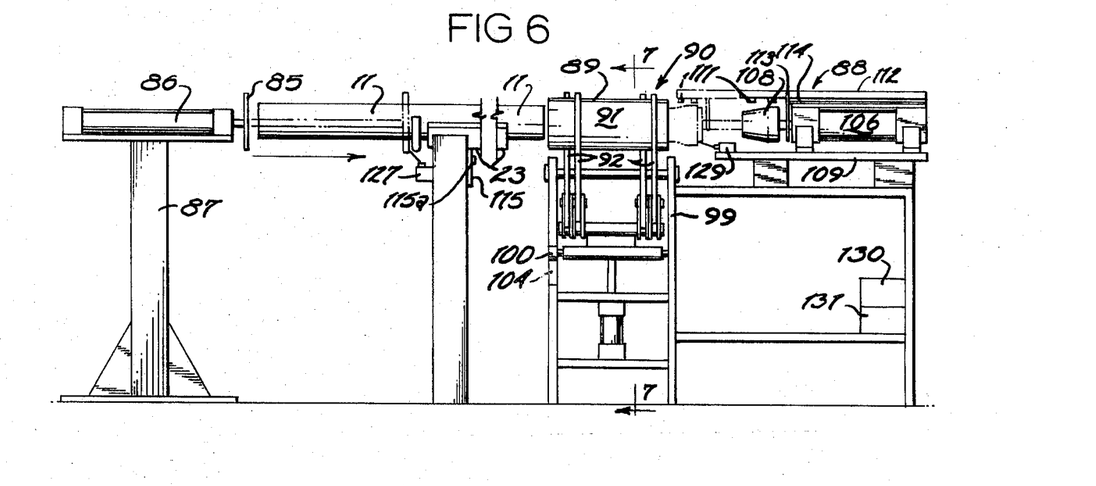
FIG. 6 is an elevational end view of the heating oven of the apparatus.

Looking at FIG. 6, a longitudinal pipe positioning cylinder 86 is shown, similar to cylinder 41 described above. Cylinder 86 is mounted on an upright frame 87 with its piston shaft coaxial with the longitudinal axis of pipe 11. A vertically planar disc 85 is affixed to the piston shaft to engage the front end of pipe 11 upon extension of cylinder 86. The retracted and extended postions of cylinder 86 and the resulting longitudinal position of pipe 11 are shown in solid and phantom lines respectively. Cylinder 86 is activated to extend, pushing pipe 11 longitudinally along trough 23 to position the heated rear end at a prescribed position relative to a pipe clamp assembly 90 and a bell forming assembly 88. Once the pipe is positioned longitudinally the cylinder 86 is locked, to prevent forward movement of the pipe in trough 23, until after the bell forming operation.

Figure 7:
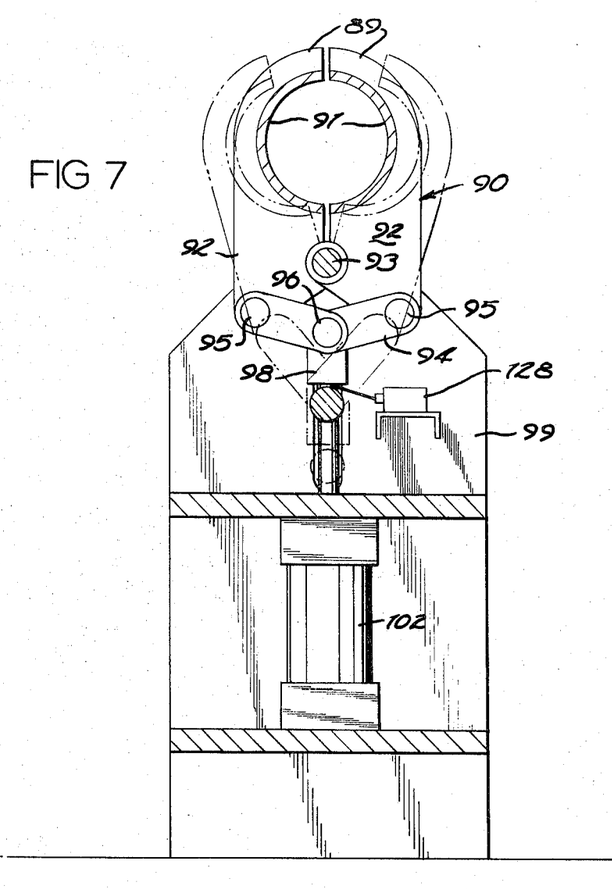
FIG. 7 is a fragmentary partially sectioned side view of the oven shown in FIG. 6.

The pipe clamp assembly 90, as shown in FIGS. 6 and 7 basically includes a pivotable set of jaws 89 linked about a common pivot 93 to a toggle linkage 94. The linkage 94 is connected to a cylinder 102 which in turn is fixed to the framework 25. Cylinder 102 is selectively activated to close and open jaws 89 to clamp and release the longitudinally positioned pipe 11.

Jaws 89 include opposed concave shoes sections 91 which, in the closed jaw position, form an open cylinder having an inside diameter substantially equal to the outside diameter of pipe 11. The longitudinal axis of the cylinder formed by the closed jaws is coaxial with the axis of pipe 11. Shoes 91 are replaceable with other shoe sections (not shown) designed to fit different diameter pipe.

Two pair of jaw arms 92 extend downwardly from shoes 91 at the front and back ends thereof, to the common pivot shaft 93. The shaft is fixed to a frame 99 with its longitudinal axis parallel to the axis of pipe 11. The lower, outer ends of arms 92 are pivotally connected at 95 to the outer ends of a pair of toggle elements 94. The inward ends of elements 94 connect at a common pivot 96 to a yoke 98 at the upper end of cylinder 102. Frame 99 supports the cylinder body in a vertically stationary position so that its extension and retraction results in the closing and or opening of jaws 89. To assure vertical movement of the cylinder shaft, rollers 100 (FIG. 6) are provided at the longitudinal ends of yoke 98 to ride in guide slots 104 in frame 10.

Jaws 89 are held in the open position (illustrated by phantom lines in FIG. 7) until pipe 11 is longitudinally positioned by cylinder 86. Once the pipe is in position, as shown by dashed lines in FIG. 6, the jaws are closed tightly about the periphery of the pipe. It may be noted in FIG. 6 that the heated end of pipe 11 protrudes rearwardly from jaws 89 to allow for expansion of that end upon insertion of a mandrel 108 of the bell forming assembly 88.

Mandrel 108, as shown by FIG. 6, is in the shape of a frustum, the axis of which is coaxial with the axis of pipe 11. The shape of mandrel 108, however, is dependent upon the desired belled pipe configuration and could conceivably have many different shapes.

Mandrel 108 is mounted to the piston shaft of a cylinder 106 for translational movement along the axis of pipe 11. Cylinder 106 is mounted to a horizontal support 109 on frame 99 rearward of jaws 89. Extension of cylinder 106 moves mandrel 108 forwardly into the heated open end of pipe 11. The soft ductile plastic easily conforms to the shape of the mandrel and remains in that configuration once the mandrel is retracted.

At the extended position of the mandrel, the heated end of pipe 11 is cooled by water directed from a longitudinally spaced pair of nozzles 111. Water or other coolant is directed to nozzles 111 through a delivery tube 112 mounted to cylinder 106. A slide actuated valve 114 is situated within tube 112 and is operated to open as the mandrel is extended and to close as the mandrel is retracted. An upwardly extending bracket 113, connects the faucets to the piston shaft of cylinder 106 for movement therewith.

After the bell is formed, the jaws 89 are automatically opened, cylinder 86 is retracted, and the completed pipe is free to be moved from trough 23 to the storage rack 24. This final step is accomplished by the assembly illustrated in FIG. 2 adjacent trough 23.

It should be noted at this point that unlike troughs 20 and 22, trough 23 is not pivotable, and is made up of several separate aligned sections, as shown in FIG. 1. With this arrangement trough 23 may be easily vertically adjusted by means such as depending slotted brackets 115 and bolts 115a (FIGS. 2 and 6). By vertically adjusting trough 23, pipes of different diameters can be aligned coaxially with the jaws 89 and mandrel 108.

The mechanism utilized to remove the finished pipe from trough 23 comprises pivotable lifter arms 116 fixed to a common pivot shaft 117. Arms 116 are selectively powered to pivot about the axis of shaft 117 by a cylinder 118. Lifter arms 116 are longitudinally spaced along the elongated shaft 117 between adjacent ends of the trough sections. Shaft 117 is rotatably mounted to frame 25 by bearings 119 (FIG. 2) at a position elevationally below and to the right of the axis of pipe 11 presently in trough 23 (FIG. 2). The cylinder 118 is connected between frame 10 and an arm 116 at a location to the left of shaft 117. Extension of cylinder 118 serves to pivot arms 116 upwardly, in a direction shown by the arrow in FIG. 2, to engage and lift the pipe 11 from trough 23. As the arms continue to pivot with shaft 117 the pipe rolls gravitationally over the arms and onto the inclined tracks 120 of the storage rack 24.

Operation of the present apparatus is accomplished automatically by controls such as electrical circuitry including a plurality of limit switches as shown in the drawings. It should be noted that the controls that are shown and described are to be taken only as a single specific example and that many other forms of controls and types of operating circuits may be successfully utilized to automate operation of the apparatus.

The forward ends of successive infeeding pipes first trip the actuating lever of a switch 121 (FIG. 2) positioned below trough 20. Switch 121 activates cylinder 29 to extend, tipping trough 20 to allow the pipe to roll gravitationally down tracks 33 to stop against abutments 34 or the pipe previously released from trough 20.

A second switch 122 is positioned adjacent abutments 34 with its actuator lever extending into the path of successive pipes rolling down tracks 33. A pipe positioned against abutments 34 operates switch 122 to activate cylinder 38. Switch 122 is connected in series with an additional switch 123, located adjacent trough 22, which senses whether or not a pipe is presently supported in trough 22. If no pipe is presently in trough 22, the circuit is completed and cylinder 38 is activated to lift the pipe over abutments 34 and thereby allow it to continue to roll down tracks 33 and into trough 22. As the pipe moves into trough 22, switch 123 is operated to activate cylinder 41 to extend, longitudinally positioning the pipe at the heating station.

The disc 40 on cylinder 41 upon reaching a preset position operates a switch 124 adjacent the forward end of trough 22. Switch 124 activates cylinder 66 to extend moving the oven 45 over a selected length of the rearward end of the pipe. Once in this position, another switch 125 is operated, by bracket 64, to activate an oven timing mechanism 130.

Timing mechanism 130 is preset to allow the oven sufficient time to heat the inserted end of the pipe until it becomes ductile. After such an interval, the mechanism 130 activates in sequence, cylinder 41 to retract, cylinder 66 to retract, and cylinder 80 to retract, allowing the pipe to roll gravitationally down tracks 82 into trough 23.

A switch 126 is mounted to frame 10 adjacent trough 23 at a position so that a pipe moving into trough 23 will engage its lever arm to operate the switch. When operated, switch 126 activates cylinder 86 (FIG. 6) to extend, longitudinally positioning the heated end of the pipe relative to the clamp and mandrel assemblies 90 and 88.

At the extended position of cylinder 86, disc 85 operates a switch 127. Switch 127, when so operated, activates cylinder 102 to extend to clamp the pipe tightly between jaws 89. Yoke 98 of the clamp assembly engages and operates a switch 128 at the closed position of jaws 89. Switch 128 activates the mandrel cylinder 106 to extend, forcing mandrel 108 into the heated open end of the pipe. At this position the slide valve 114 is opened to allow coolant to flow from nozzles 111 over the heated pipe end.

Mandrel 108 is held within the pipe over a prescribed time interval by a second timing mechanism 131. Mechanism 131 is activated as mandrel 108 is inserted into the heated end of the pipe by a switch 129 (FIG. 6). The time interval is sufficient to allow the heated pipe end to cool and harden on the mandrel before it is retracted. After the interval has elapsed, the mechanism 131, which incidently could be an integral part of mechanism 130, activates, in sequence, the mandrel assembly to retract, the clamp assembly to open, and the cylinder 118 to retract, allowing the finished pipe to roll gravitationally down tracks 120 to storage rack 24.

It should be understood that the above description, taken with the accompanying drawings are exemplary of the invention which is clearly defined in the following claims:

What I claim is:

1. A belling and handling apparatus for plastic pipe in pre-selected lengths of constant diameter along a straight pipe axis, comprising:
   first pipe support means in the form of an upwardly open trough for receiving an individual pipe length and fixing the location of the pipe axis;
   pipe delivery means for moving individual pipe lengths to said first pipe support means;
   first pipe locating means at said first pipe support means for longitudinally shifting the position of each pipe along its axis while on said first pipe support means to thereby move the pipe to a preselected longitudinal location;
   pipe heating means movably mounted at one end of said first pipe support means for movement with respect to said first pipe support means between a retracted position clear of pipe at said preselected longitudinal location and an extended position wherein one end of the pipe is received within the pipe heating means;
   second pipe support means in the form of an upwardly open trough transversely and elevationally spaced below the elevation of the trough of said first pipe support means and parallel thereto, said second pipe support means being adapted to hold an individual pipe length;
   pipe transfer means for moving individual pipe lengths from said first pipe support means to said second pipe support means by gravity;
   second pipe locating means at said second pipe support means for longitudinally shifting each pipe length therein along its pipe axis to a preselected longitudinal location thereon;
   pipe clamping means for fixing the location of each pipe at said last-mentioned preselected longitudinal location along the second pipe locating means;

pipe belling means movably mounted at one end of said second pipe support means for movement with respect to said second pipe support means between a retracted position clear of pipe at said last-mentioned preselected longitudinal location on said second pipe support means and an extended position wherein the heated end of pipe held by said pipe clamping means is engaged by the pipe forming means to alter its circumferential configuration; and
   pipe discharge means for removing each pipe length from said second pipe locating means.

2. An apparatus as set out in claim 1 wherein said pipe heating means comprises an oven at said one end of said first pipe support means, said oven having a central heating chamber centered along an axis coaxial with the axis of pipe on said first pipe support means, said oven having a heating chamber including a coaxial opening facing outward toward said first pipe support means and adapted to receive said one end of the individual pipe length.

3. An apparatus as set out in claim 1 wherein said first pipe locating means comprises a solid surface outward of the remaining end of said first pipe support means and perpendicular to the axis of the pipe length located upon said first pipe support means;
   said surface being movable along the pipe axis for abutting and enlosing the end of the pipe length opposite to said one end thereof.

4. An apparatus as set out in claim 1 wherein said pipe transfer means comprises:
   means operatively connected to the trough of said first pipe support means for selectively pivoting the trough about a longitudinal axis parallel to the axis of a pipe length thereon to thereby cause the pipe to roll out one side of the trough in the direction of said second pipe support means;
   and inclined tracks extending between the troughs of said first and second pipe support means for guiding the rolling pipe into the trough of said second pipe support means.

5. A belling and handling apparatus for plastic pipe having a constant preselected length, comprising:
- a supporting framework;
- a first upwardly open longitudinal trough mounted on said framework for pivotal movement about a first longitudinal axis between a balanced upright support position for locating pipe thereon and a tilted position for causing pipe thereon to roll from the trough transversely across the framework;
- a second upwardly open longitudinal trough coextensive in length to said first trough and mounted on said framework at a position parallel and transversely spaced from the first trough for pivotal movement about a second longitudinal axis between a balanced support position for locating pipe thereon and a tilted position for causing pipe thereon to roll to one side across the supporting framework;
- first and second power operating means operatively connected between the framework and said first and second troughs, respectively, for selectively moving said troughs between their balanced upright support positions and their tilted positions;
- guide means on said framework for supporting engagement by pipe leaving said first trough, said guide means being extended transversely across the framework between the first trough and the second trough to direct pipe onto the second trough;
- an oven at one longitudinal end of the first trough, said oven having a heated chamber coaxial with pipe located on said first trough and being movably mounted on the framework independent of the trough for movement along its axis between a retracted position clear of pipe positioned on the first trough and an extended position wherein the adjacent ends of pipe on the first trough is received within the heated chamber of the oven; and
- a pipe belling means movably mounted on the apparatus for movement with respect to the respective pipe support framework between a retracted position and an operative extending position.

6. An apparatus as set out in the claim 5 further comprising pusher means movably mounted to the supporting framework at the remaining end of said first trough and coaxially centered relative to pipe located on the trough for abutting the pipe and pushing it along the trough to a preselected longitudinal position.

7. An apparatus as set out in claim 6, wherein said pipe belling means comprises:
- a pipe-forming mandrel mounted on said framework at the end of the second trough corresponding to said one end of the first trough, said mandrel being coaxial with pipe on said second trough and being movably supported on the framework for movement independent of said second trough between a retracted position clear of pipe on the second trough and an extended position wherein the mandrel is inserted within pipe located on the second trough.

8. An apparatus as set out in claim 6 further comprising:
- a clamp mechanism on the framework adjacent to said second trough for selectively engaging and fixing the position of a pipe on said second trough prior to insertion of said mandrel.

* * * * *